United States Patent
Yee et al.

[19]

[11] Patent Number: 5,923,402
[45] Date of Patent: Jul. 13, 1999

[54] TRACTOR-TYPE FILM TRANSPORT APPARATUS

[76] Inventors: Keir Yee, 3811 Maiden St., Waterford, Mich. 48329; Brian J. Baba, 2911 Ostego Rd., Waterford, Mich. 48328; Philip Lieberman, 15920 Lauderdale, Franklin, Mich. 48025

[21] Appl. No.: 08/943,262

[22] Filed: Oct. 3, 1997

[51] Int. Cl.⁶ .................................................. G03B 1/00
[52] U.S. Cl. ........................ 352/184; 352/187; 352/191
[58] Field of Search .................................. 352/184, 187, 352/191

[56] References Cited

U.S. PATENT DOCUMENTS

| | | | |
|---|---|---|---|
| 2,818,467 | 12/1957 | Harris et al. | 352/187 |
| 3,303,981 | 2/1967 | Wiese | 352/184 |
| 3,677,625 | 7/1972 | Stolzenwald et al. | 352/91 |
| 3,724,937 | 4/1973 | Jenkins et al. | 352/140 |
| 3,776,626 | 12/1973 | Lewis | 352/194 |
| 3,811,761 | 5/1974 | Krumbein | 352/166 |
| 3,937,568 | 2/1976 | Kira | 353/68 |
| 4,037,954 | 7/1977 | Scheib | 355/50 |
| 4,084,892 | 4/1978 | Bagby et al. | 352/29 |
| 4,131,344 | 12/1978 | Hardy | 352/130 |
| 4,222,648 | 9/1980 | Beaver | 354/171 |
| 4,253,749 | 3/1981 | Boudouris | 352/187 |
| 4,360,254 | 11/1982 | Nyman et al. | 352/166 |
| 4,537,482 | 8/1985 | Weiner | 352/184 |
| 4,863,262 | 9/1989 | Berggren et al. | 352/187 |
| 5,266,979 | 11/1993 | Brown et al. | 352/187 |
| 5,285,225 | 2/1994 | Blaschek et al. | 352/93 |
| 5,333,020 | 7/1994 | Tsukada et al. | 352/166 |
| 5,341,182 | 8/1994 | Schmidt | 352/184 |
| 5,633,696 | 5/1997 | Schmidt | 352/184 |

*Primary Examiner*—Russell Adams
*Attorney, Agent, or Firm*—Gifford, Krass, Groh, Sprinkle, Anderson & Citkowski, PC

[57] ABSTRACT

A direct-drive, tractor-type film transport apparatus operates at rates typically used for sync sound, high-speed and special effects applications. A preferred embodiment includes three sprockets, each with a plurality of radially outwardly extending pins on either side to receive the sprocket holes of the film while positioned in the film plane. A pair of belts is also preferably used to rotationally interconnect the three sprockets, each belt being perforated to receive the outwardly extending pins on either side of each sprocket. An apertured gate overlays the film in the film plane, the gate including a back side with grooves to receive at least the pins of the middle sprocket, thereby enabling the gate to function as a pressure plate. A microprocessor-controlled servo motor is preferably used to reversibly drive the middle sprocket, with the two outer sprockets being slightly biased away from the middle sprocket so as to keep a central section of the film taunt during the exposure thereof.

10 Claims, 5 Drawing Sheets

TRACTOR-TYPE FILM TRANSPORT APPARATUS

FIELD OF THE INVENTION

The present invention relates generally to motion picture cameras and, in particular, to such a camera having a direct-drive, servo-controlled tractor-type film transport mechanism.

BACKGROUND OF THE INVENTION

Existing motion-picture film cameras designed for sync sound or mos (without sound) production utilize a single motor to drive the various mechanisms associated with film transportation and exposure. As shown in FIG. 1, the motor typically drives a main sprocket 104, which is coupled to a cam or geneva-type assembly to control the movement of "pull-down claws" 108. Once pulled down, or moved into place, a separate set of registration pins (not visible in the figure) are used to hold the film in place during exposure.

The single motor used in this type of camera may rotate at a continuous or variable speed, but it never stops. A variable speed is used only to increase or decrease the frame rate or the number of frames being exposed per second. A mirror or shutter rotates constantly between the rear lens element 112 and an opening 114 (known as the "gate"), where the film is exposed. Several gears are used to operate the mirror from the same motor used for film transportation. The mirror or shutter is commonly a disc shaped object 110 which is mirrored for 180 degrees and open for the additional 180 degrees. The mirrored portion is rotated in front of the gate as the film is being pulled or moved into place for exposure. After the registration pins have entered the film to hold it in place, the open 180 degrees rotates in front of the gate allowing light through the lens element to expose the film.

The speed of the single sprocket motor is commonly governed by a crystal for frame-rate accuracy. A few newer cameras use a microprocessor to govern speed. In any event, the single-motor concept requires complicated gearing to achieve the movement of the film, magazine feed/take-up displacement and mirror (shutter) rotation.

Some cameras have a variable shutter which allows an operator to adjust the amount of time the film is being exposed. This is accomplished by increasing or decreasing the degrees of the mirrored portion of the shutter; regardless, the shutter will still spin continuously and in relation to the speed setting of the single motor. Additionally, film supply (120) and take-up reels 122 are controlled from the single motor using a different set of gearing than used in conjunction with the shutter system. Control of "feed" and "take-up" is critical in existing cameras, as the torque required to pull or move the film through the gate is much greater than the film transport mechanism can handle. As a consequence, a "loop" (slack in the film path) such as 130 is used to lessen the pull requirement of the cam or geneva mechanism.

In addition to the type of mechanism just described, there does exist a class of cameras which incorporate a stepper-motor driven film transport. For example, in U.S. Pat. No. 4,360,254, to Nyman et al., entitled CAMERA HAVING STEPPER MOTOR DRIVEN FILM TRANSPORT/REGISTRATION SPROCKET, a single stepping motor is coupled to a sprocket used to advance the film bidirectionally in a 'tight-loop' transport arrangement. A microprocessor is used to independently drive the film transport, magazine feed and take-up, shutter registration and mirror control.

Although the patent just discussed mentions that the camera may be used in movie animation as well as other applications, units of this kind are designed primarily for non-sync or non-action cinematography, and are therefore usually relegated to slide reproduction or animation. Accordingly, there exists an outstanding need for a direct-drive, servo-controlled film camera capable of being used for both on-location and non-sync or non-action cinematography.

SUMMARY OF THE INVENTION

The present invention improves upon prior-art camera designs by providing a direct-drive, tractor-type film transport apparatus including independent, servo-controlled subsystems, enabling the strip of film to be transported at rates typically used for sync sound, high-speed and special effects applications. The transport features a plurality of sprockets supported for independent rotation to define a film least one of the sprockets further includes a plurality of radially outwardly extending pins to receive the sprocket holes of the film, and drive means are provided for rotating one or more of the sprockets so as to advance the film in the film plane.

In a preferred embodiment the transport includes three sprockets, each with a plurality of radially outwardly extending pins on either side to receive the sprocket holes of the film while positioned in the film plane. A pair of belts is also preferably used to rotationally interconnect the three sprockets, each belt being perforated to receive the outwardly extending pins on either side of each sprocket. An apertured gate overlays the film in the film plane, the gate including a back side with grooves to receive at least the pins of the middle sprocket, thereby enabling the gate to function as a pressure plate. A microprocessor-controlled servo motor is preferably used to reversibly drive the middle sprocket, with the two outer sprockets being slightly biased away from the middle sprocket so as to keep a central section of the film taunt during the exposure thereof.

DETAILED DESCRIPTION OF THE INVENTION

All existing cameras use one to four registration pins within the gate to hold the film in place during exposure. These pins operate with a cam/geneva mechanism which allows the pins to enter the perforations in a straight, aligned manner, and they are held in position before the pull-down claws or even the sprockets advance the film to the next frame.

Figure 1:
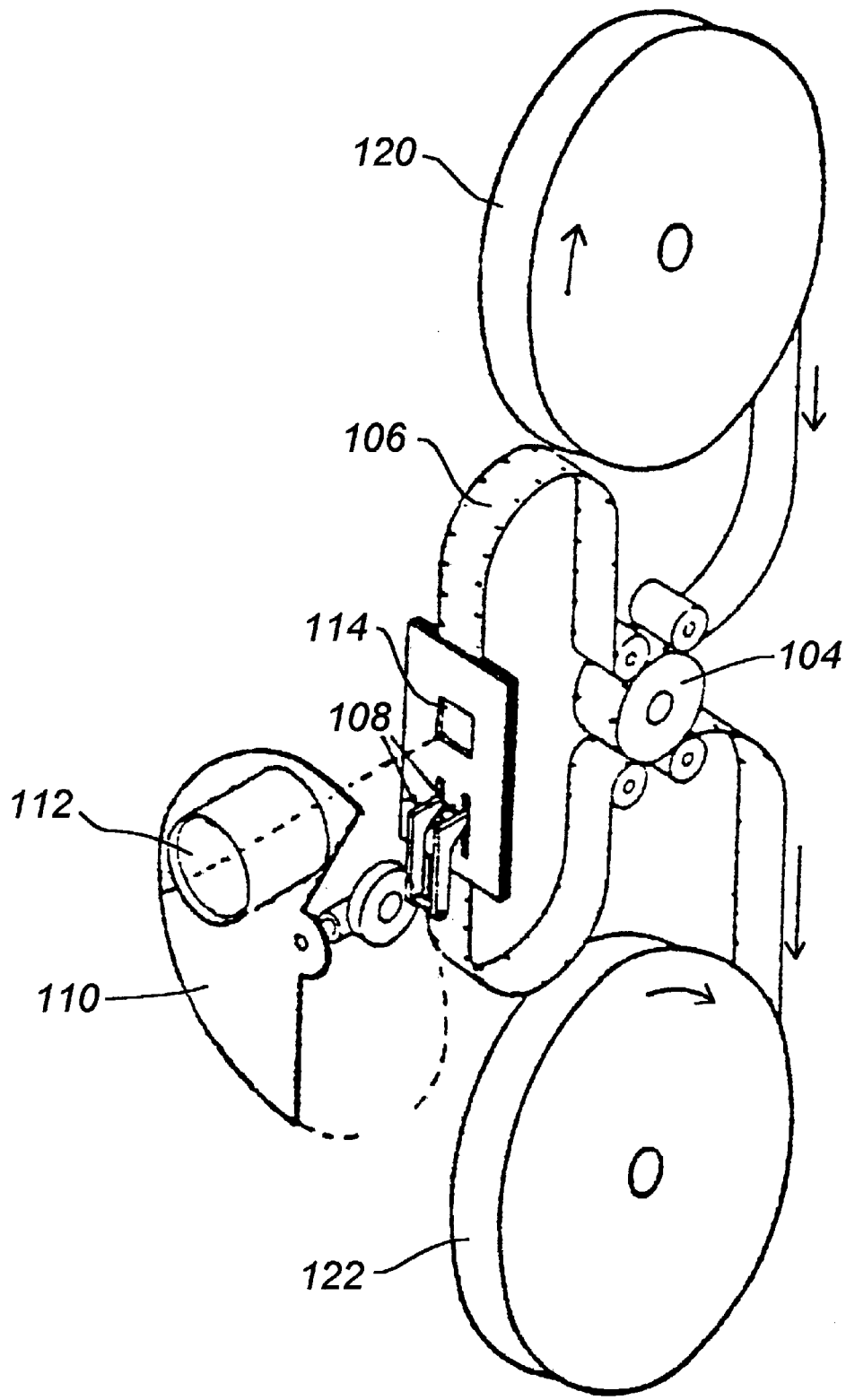
FIG. 1 an oblique representation of a prior-art film transport mechanism as commonly used in existing motion-picture cameras.
Figure 2:
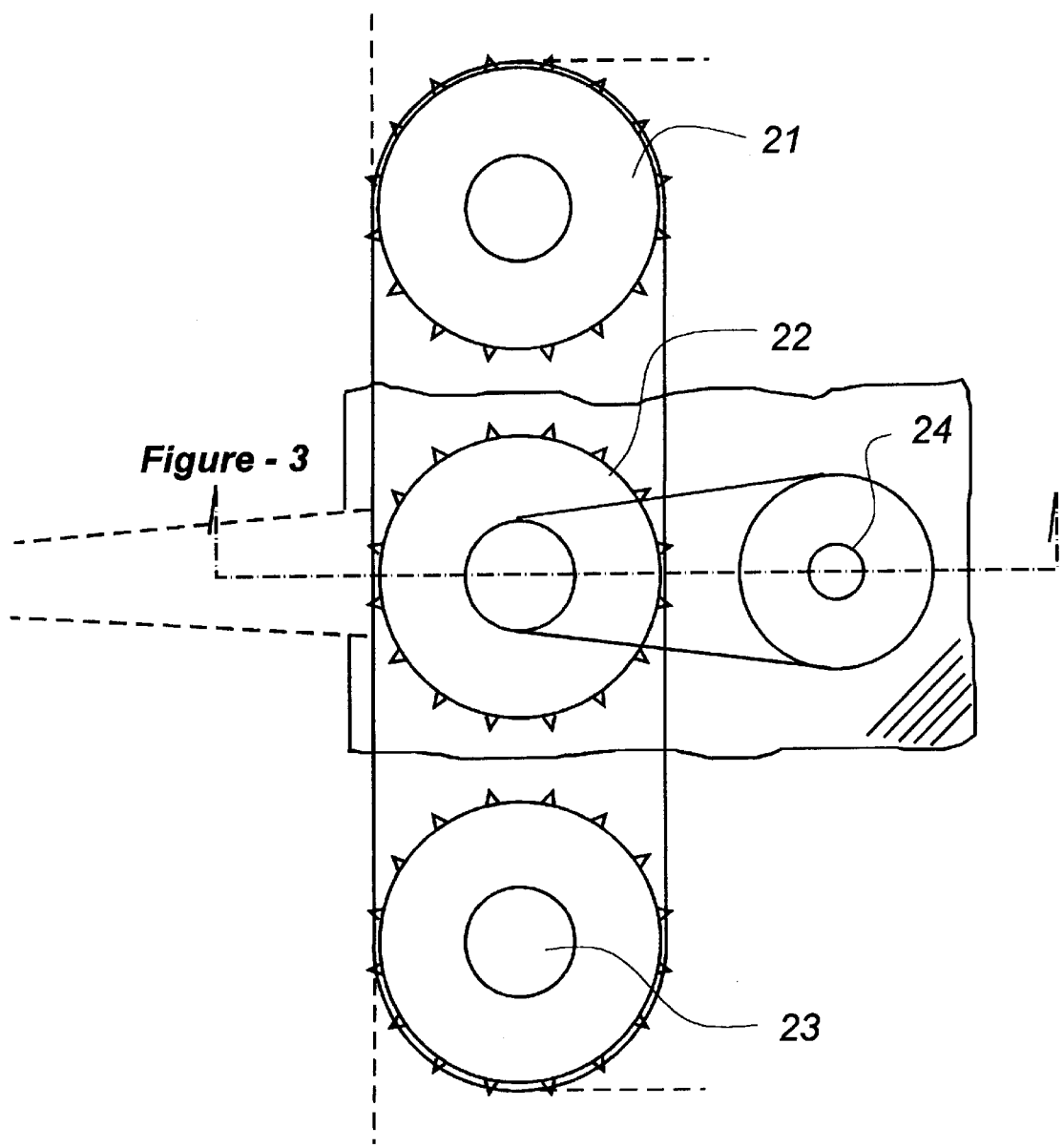
FIG. 2 is a simplified, side-view drawing of an improved film transport according to this invention.
Figure 3:
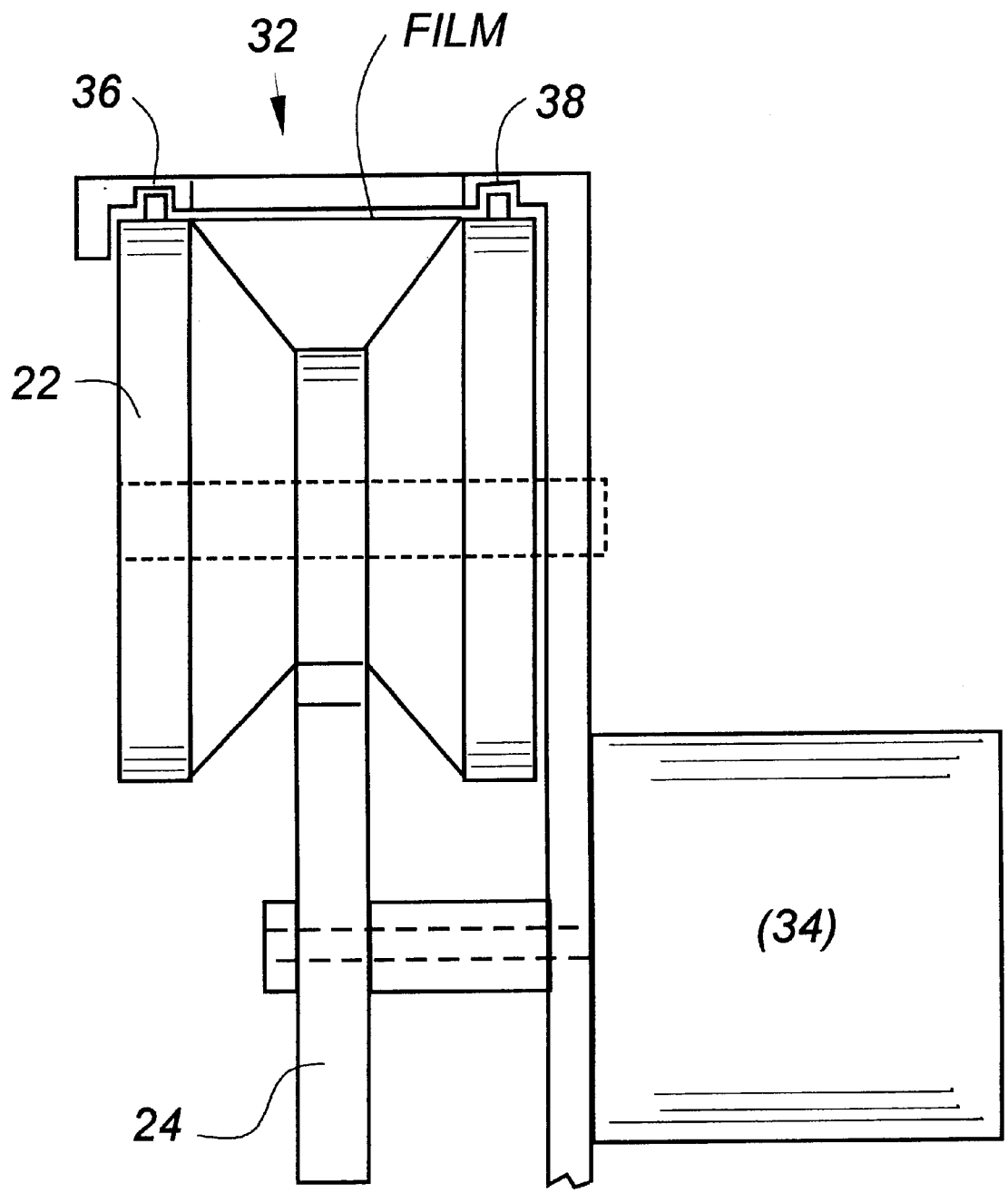
FIG. 3 is a section of the improved film transport of FIG. 2 taken along the section lines shown in the drawing.

The present invention resides in a servo-controlled, tractor-type film transportation mechanism and gearless exposure system, wherein film transport and registration are effectively combined. As shown in FIG. 2, four large rollers 21, 22, 23 and 24 are employed. Rollers 21, 22 and 23 have sprockets sized and tapered to enter through perforations into channels machined into a gate 32, which is best seen in FIG. 3, allowing the continuous surface of the roller to act as a pressure plate. The forth roller, 24, located behind the other three, is driven directly, preferably by a flat-armature d.c. servo motor 34, also best seen in FIG. 3. The fourth roller 24, intermittently controlled by the motor 34, drives the three rollers with sprockets engaged in the films perforations. The use of a separate motor allows for the film transport to advance, pause for exposure, then advance again without effecting other motors used for the feed, take-up, and shutter rotation, as discussed below.

The three rollers 21, 22 and 23 facing the gate 32 apply constant pressure and pin registration above, within and below the gate. Since a substantial amount of the torque required to transport the film is shared by the feed and take-up motors, there is no need for film loops above and below the gate. The use of a tractor-type film transport also ensures that the film will remain consistent in terms of horizontal registration and vertical positioning, preferably to within one ten-thousandth of an inch.

Figure 4:
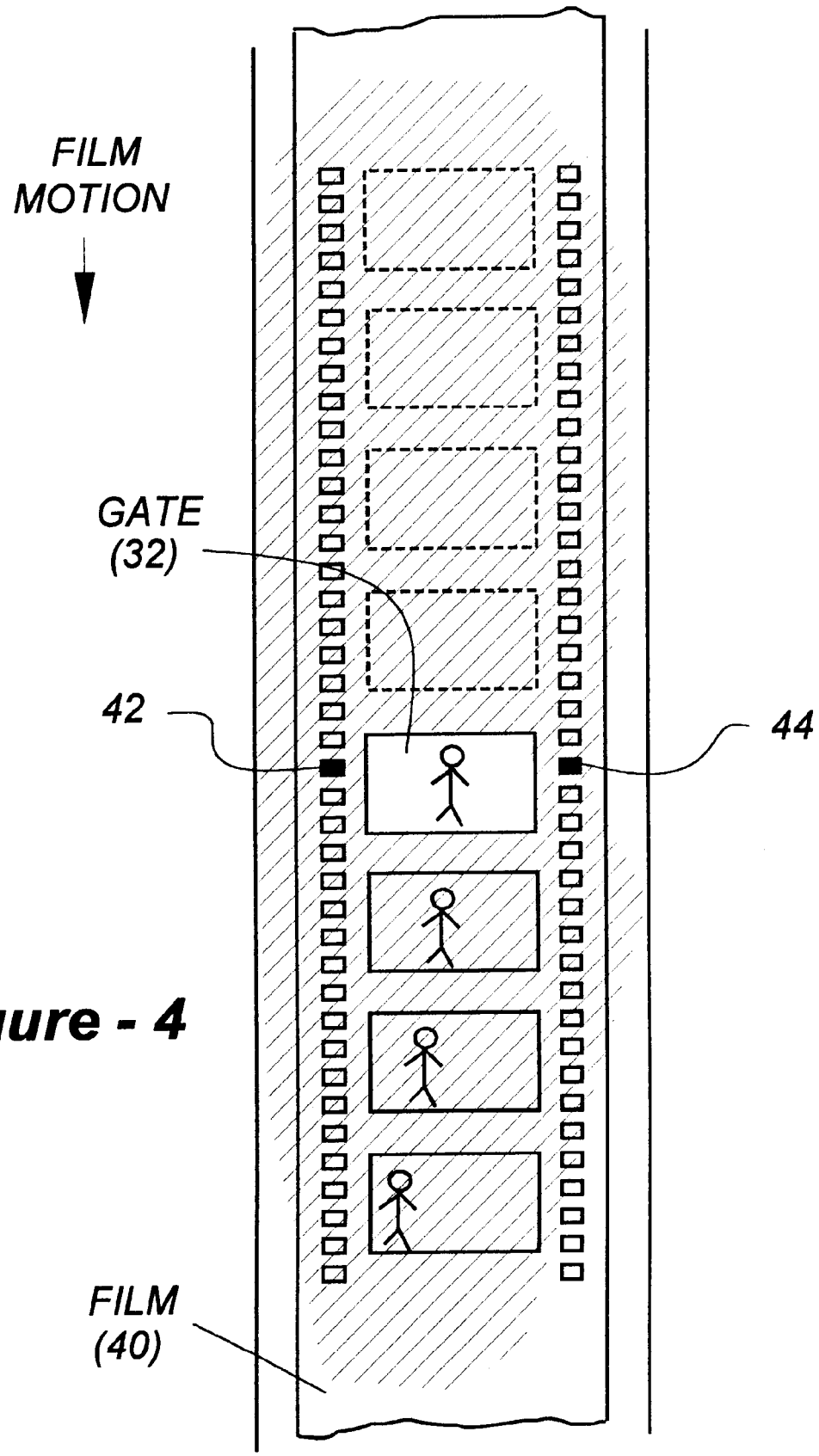
FIG. 4 is a front-view drawing used to illustrate a relative position between the gate and sprocket pins of the invention.

Thus, according to this invention, the pull-down claws and registration pins are effectively one in the same. The three sprockets 21–23 are driven intermittently, pulling each frame into the aperture then pausing for exposure. Preferably, registration of the film is accomplished with two pins per sprocket on both sides of the film at 27.96 mm centers above, at and below the aperture. As shown in FIG. 4, if there are eight perforation within each frame, the film 40 may be registered using the second from top, right and left perforations 42 and 44.

Additionally, the film is keep taught in the gate and pressure applied by the upper and lower sprockets. This is accomplished by using a series of pins around three sprockets within the gate machined to a 1.984 mm diameter, flattened 0.0755 mm on both leading and trailing edge, spaced to 4.716 mm centers and then tapered for 0.833 mm to a diameter of 1.587 mm for entry tolerances into the perforations.

The pins enter two channels 36 and 38, cut into but not through the gate, as best seen in FIG. 3, allowing the rim of the sprockets to also act as the pressure plate. The sprockets are preferably machined out of Nyatron GX for its dimensional stability and scratch resistant surface.

Figure 5:
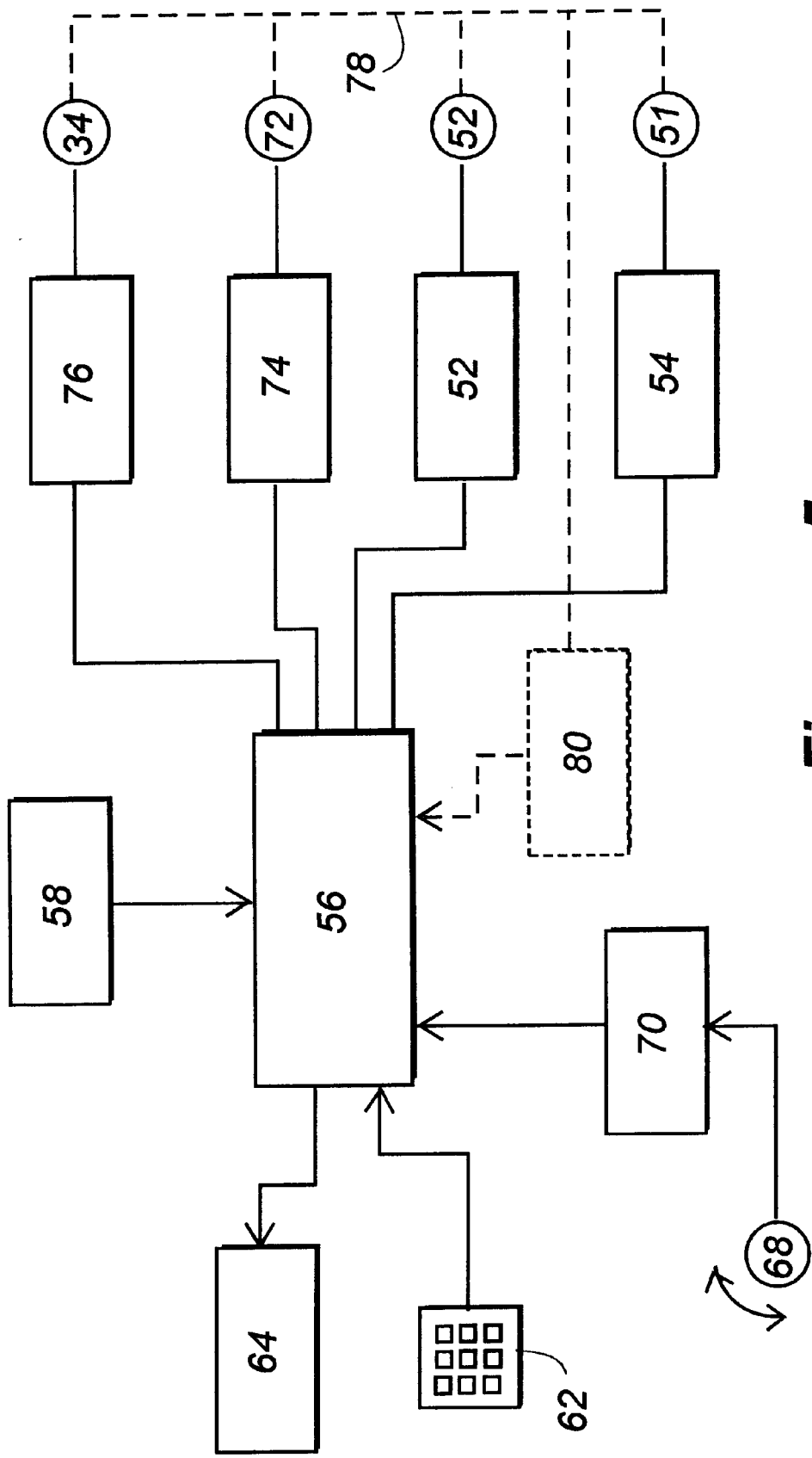
FIG. 5 is a block diagram illustrating major functional electrical subsystems according to the invention.

The intermittent movement of the three sprockets is achieved using independent d.c. brushless flat-armature servo motors 50 and 51, controlled for stopping and starting actions by separate digital servo amplifiers 52 and 54, as shown in FIG. 5. Motor speed and action duration information are feed to a microprocessor 56, which determines the speed of all other independently driven components of the camera. The microprocessor 56 is preferably of a conventional design, preferably in the form of a single-chip microcomputer with single "on-board" random-access memory, and read-only memory for program storage. A clock 58 provides an accurate time base in the form of a crystal-controlled oscillator. Keypad 62 allows operator commands to be entered into the system, with display 64 being used to output status information. Preferably a shuttle 68 is provided along with an appropriate interface circuit 70 to permit manual yet rapid bi-directional film movement.

Other components include a mirror (not shown) driven by its own d.c. brushless, flat-armature servo motor 72, which rotates continuously in time with the movement sprockets. This allows the mirror to be intermittently controlled so as to adjust for time-lapse exposures. Servo 72 is driven by its own amplifier 74, as is the main transport motor 34, driven by amplifier 76. Broken line 78 is used to indicate that shaft or optical encoders may be used with one or more of the motors and fed to an interface device 80, enabling the microprocessor 56 to sense the exact positioning of one or more of the motor drives.

For in-camera effects, the film may be transported in reverse. Constant engagement in the tractor-type film transport allows the film to be accurately reversed to a specific frame and cued for double exposure. To accomplish this, without the exposing the film during the reversal, the mirror motor senses the transport motor in a reverse setting and automatically closes the gate. With minimized torque requirements, the film reaches sync speed instantly.

To compensate for additional weight added by multiple motors and servo amplifiers, the camera's body is molded from a lightweight plastic composite. The preferred material is a self-lubricating plastic which allows the gears to be encased in a sound-proof chamber requiring little or no access for maintenance.

External sound in most cameras is generated two ways. First, noise is produced as the film perforations enter and exit the registration pins. This is inherently eliminated through the use of tractor-type film transportation. A second source is noise generated by engaging metal gears, which is eliminated through the use of an all-plastic gear chain. The preferred plastics include Pet® and Tektron®, both of which have the dimensional stability and wear resistance needed for the camera's precision.

As shown with the broken lines 26 in FIG. 2, the film entering into, and leaving, the film transport according to the invention may either assume an orientation parallel to the film within the transport, or may come off of the outer sprockets 21 and 23 at some angle. In any event, the film is distributed and properly displaced using third and fourth servo motors 50 and 51, which may form part of an existing magazine supply/take-up mechanism. Having all independent motors allows the film to be reversed to a specific frame while the shutter remains closed (mirror in front of the aperture) to prevent exposure. Each component is a direct drive configuration which eliminates the need for complicated gearing.

That claimed is:

1. A tractor-type transport for film having an emulsion side and sprocket holes, comprising:

a plurality of sprockets, each having a cylindrical sidewall bounded by two opposing outer edges, each sprocket being supported for independent rotation such that two straight lines, each tangent to the outer edges on one side of each sprocket are parallel to one another and define a film plane, at least one of the sprockets further including a plurality of radially outwardly extending pins to receive the sprocket holes of the film while positioned in the film plane, with the emulsion side of the film facing outwardly from the sprockets, image projection means for directing an image onto the emulsion side of the film so as to expose the film; and drive means for rotating one or more of the sprockets so as to advance the film.

2. The film transport of claim 1, wherein the drive means further includes a belt rotationally interconnecting the sprockets.

3. The film transport of claim 1, wherein the image projection means further includes an apertured gate supported over a portion of the film while positioned in the film plane.

4. The film transport of claim 3, wherein the gate has a back side oriented toward the emulsion side of the film, the back side including a groove to receive outwardly extending pins, thereby enabling the gate to act as a pressure plate.

5. The film transport of claim 1, wherein two of the sprockets are slightly biased away from one another so as to keep a section of the film taunt during the exposure thereof.

6. The film transport of claim 1, including three sprockets, two on either side of a middle sprocket, with the image projection means being located closest to the middle sprocket.

7. The film transport of claim 5, further including:
   one or more belts rotationally interconnecting the three sprockets; and
   a motor driving one of the three sprockets.

8. A tractor-type transport for film having an emulsion side and sprocket holes, comprising:
   three sprockets, each having a cylindrical sidewall bounded by two opposing outer edges, each sprocket being supported for independent rotation such that two straight lines, each tangent to the outer edges on one side of each sprocket are parallel to one another and define a film plane,
   each sprocket including a plurality of radially outwardly extending pins on either side to receive the sprocket holes of the film while positioned in the film plane, with the emulsion side of the film facing outwardly from the sprockets;
   an apertured gate overlying the film in the film plane, the gate including a back side with grooves to receive at least the pins of the middle sprocket, thereby enabling the gate to function as a pressure plate;
   image projection means for directing an image through the apertured gate and onto the emulsion side of the film so as to expose the film; and
   drive means coupled to one or more of the sprockets so as to advance the film.

9. The transport of claim 8, further including a pair of belts rotationally interconnecting the three sprockets, each belt being perforated to receive the outwardly extending pins on either side of each sprocket.

10. The film transport of claim 8, wherein the two outer sprockets are slightly biased away from the middle sprocket so as to keep a central section of the film taunt during the exposure thereof.

* * * * *